US011382264B2

(12) United States Patent
Ito et al.

(10) Patent No.: US 11,382,264 B2
(45) Date of Patent: Jul. 12, 2022

(54) MOWER UNIT FOR HEAT DISCHARGE AND SOUNDPROOFING

(71) Applicant: Kubota Corporation, Osaka (JP)

(72) Inventors: Hirokazu Ito, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 184 days.

(21) Appl. No.: 16/009,868

(22) Filed: Jun. 15, 2018

(65) Prior Publication Data

US 2019/0124837 A1 May 2, 2019

(30) Foreign Application Priority Data

Nov. 2, 2017 (JP) .............................. JP2017-212793
Nov. 2, 2017 (JP) .............................. JP2017-212794

(51) Int. Cl.
| | | |
|---|---|---|
| *A01D 34/78* | (2006.01) | |
| *A01D 34/82* | (2006.01) | |
| *A01D 34/66* | (2006.01) | |
| *A01D 69/02* | (2006.01) | |
| *A01D 34/81* | (2006.01) | |
| *A01D 101/00* | (2006.01) | |

(52) U.S. Cl.
CPC ............. *A01D 34/78* (2013.01); *A01D 34/66* (2013.01); *A01D 34/81* (2013.01); *A01D 34/82* (2013.01); *A01D 69/02* (2013.01); *A01D 2101/00* (2013.01)

(58) Field of Classification Search
CPC ........ A01D 34/78; A01D 34/81; A01D 34/82; A01D 34/66; A01D 34/006; A01D 69/02; A01D 69/025; A01D 34/64; A01D 34/58; H02K 9/00; H02K 9/02; H02K 9/04
See application file for complete search history.

(56) References Cited

U.S. PATENT DOCUMENTS

| | | | | |
|---|---|---|---|---|
| 3,230,695 A | * | 1/1966 | West ................... | A01D 34/6806 56/10.5 |
| 6,348,748 B1 | * | 2/2002 | Yamamoto ............ | F04D 29/424 310/62 |
| 6,774,514 B2 | * | 8/2004 | Matsuoka ................ | H02K 5/18 310/58 |
| 7,528,517 B2 | * | 5/2009 | Shibukawa .............. | H02K 3/28 310/208 |

(Continued)

FOREIGN PATENT DOCUMENTS

| | | | | |
|---|---|---|---|---|
| FR | 2355438 A1 | * | 1/1978 | ......... A01D 34/6806 |
| JP | 6133617 A | | 5/1994 | |

(Continued)

*Primary Examiner* — Thomas B Will
*Assistant Examiner* — Joan D Misa
(74) *Attorney, Agent, or Firm* — The Webb Law Firm

(57) ABSTRACT

A mower unit 3 includes a rotational shaft extending upwards through a top wall of a mower deck, a cutter blade attached to a lower portion of the rotational shaft, a mower motor 4 having a rotor 43 disposed upward and a coil 42 disposed downward along an axial direction of an output shaft 41, a mount deck 5 having a horizontal mounting face for mounting the mower motor 4 in such a manner that the output shaft 41 assumes a vertical posture, the mount deck protruding outwards from a side wall of the mower deck, and a cooling arrangement 50 incorporated in the mound deck 5 for discharging heat of the mower motor 4.

4 Claims, 9 Drawing Sheets

(56) References Cited

U.S. PATENT DOCUMENTS

| | | | | |
|---|---|---|---|---|
| 7,554,213 | B2* | 6/2009 | Kawakami | B60L 50/00 290/40 R |
| 7,677,344 | B2* | 3/2010 | Medina | A01D 42/00 180/167 |
| 7,777,444 | B2* | 8/2010 | Kawakami | A01D 34/69 318/362 |
| 8,191,343 | B1* | 6/2012 | Hauser | A01D 34/78 56/11.9 |
| 8,227,948 | B1* | 7/2012 | Fox | A01D 34/03 310/89 |
| 8,615,976 | B1* | 12/2013 | Hauser | H02K 7/1025 310/89 |
| 9,160,211 | B2* | 10/2015 | Tanimoto | H02K 9/06 |
| 9,301,443 | B2* | 4/2016 | Hashima | B60W 10/08 |
| 9,787,158 | B2* | 10/2017 | van de Voort van de Kley | H02K 21/24 |
| 9,866,088 | B1* | 1/2018 | Hauser | H02K 16/02 |
| 9,949,436 | B2* | 4/2018 | Ito | A01D 34/73 |
| 10,106,027 | B1* | 10/2018 | Keller | B60K 11/02 |
| 10,188,032 | B2* | 1/2019 | Ito | A01D 34/78 |
| 10,358,040 | B1* | 7/2019 | Keller | B60K 1/02 |
| 10,426,084 | B2* | 10/2019 | Ito | A01D 34/78 |
| 10,485,175 | B2* | 11/2019 | Ito | A01D 34/81 |
| 2007/0165100 | A1 | 7/2007 | Shinozaki | |
| 2010/0052449 | A1 | 3/2010 | Hashimoto et al. | |
| 2011/0239613 | A1* | 10/2011 | Isono | H02K 13/006 56/202 |
| 2012/0104983 | A1 | 5/2012 | Tanimoto et al. | |
| 2015/0359170 | A1* | 12/2015 | Ito | A01D 34/78 56/16.9 |
| 2015/0359174 | A1* | 12/2015 | Ito | A01D 34/78 56/16.9 |
| 2016/0200171 | A1 | 7/2016 | Nagasaka et al. | |
| 2017/0013780 | A1 | 1/2017 | Ito et al. | |
| 2018/0146620 | A1* | 5/2018 | Uchimi | A01D 34/78 |

FOREIGN PATENT DOCUMENTS

| | | |
|---|---|---|
| JP | 8263616 A | 10/1996 |
| JP | H09006243 A | 1/1997 |
| JP | 2001312884 A | 11/2001 |
| JP | 2002345317 A | 12/2002 |
| JP | 2004121098 A | 4/2004 |
| JP | 2007219508 A | 8/2007 |
| JP | 2008146553 A | 6/2008 |
| JP | 2010063242 A | 3/2010 |
| JP | 2011654 A | 1/2011 |
| JP | 2011078256 A | 4/2011 |
| JP | 2015084622 A | 4/2015 |
| JP | 201718054 A | 1/2017 |

* cited by examiner

MOWER UNIT FOR HEAT DISCHARGE AND SOUNDPROOFING

CROSS-REFERENCE TO RELATED APPLICATIONS

This application claims priority to Japanese Patent Application Nos. 2017-212793 and 2017-212794, both filed Nov. 2, 2017, the disclosures of which are hereby incorporated in their entirety by reference.

BACKGROUND OF THE INVENTION

Field of the Invention

The present invention relates to a mower unit mounted to a grass (or lawn) mower and having a cutter blade driven by an electric motor.

The present invention relates also to a mower unit to be mounted to a grass (or lawn) mower.

Description of Related Art

[1] A grass mower disclosed in Japanese Unexamined Patent Application Publication No. 2017-18054 includes an electric powered mower unit. This mower unit includes cutter blades coupled to a plurality of rotational shafts that extend upwards through a top wall of a mower deck and that are disposed side by side, an electric motor disposed on a lateral wall of the mower deck, and a power transmission mechanism that extends above the top wall of the mower deck for transmitting power from a motor output shaft to the rotational shafts. The electric motor is mounted on a mount deck provided as an auxiliary deck formed lower than the top wall by the height of the electric motor. When the electric motor is to be mounted on the mount deck, a mounting face formed in the electric motor is superposed in face contact on/with a mounted face formed in the mount deck. Heat generated at the electric motor is transmitted via the mount deck to the mower deck to be discharged therefrom.

In the case of cooling arrangement of the electric motor according to JP No. 2017-18054, the arrangement is simply that heat generated at the electric motor is transmitted via the mount deck to the mower deck acting as a heatsink. So, cooling efficiency is not sufficient, thus, there is the possibility of the electric motor being not cooled in a reliable manner.

[2] A mower unit includes a mower deck consisting of a top plate and a side plate extending downwards from the top plate, and this top plate supports a rotational shaft for rotating a cutter blade inside the mower deck. Since the mower deck is a bowl-like structure formed of plate members and the rotational shaft for rotating the cutter blade at a high speed is supported to the top plate, vibration is generated in the mower deck and also rotation noise of the cutter blade and grass cutting noise are propagated to the mower deck. And, with solid propagation sound propagated to the mower deck, noise is discharged from the mower deck.

Japanese Unexamined Patent Application Publication No. Hei. 6-133617 discloses an anti-vibration arrangement provided in a mower unit. In this anti-vibration arrangement, an anti-vibration tool is interposed between a bevel gear accommodation case which supports a rotational shaft and which is fixed to a top plate and this top plate.

Japanese Unexamined Patent Application Publication No. 2002-345317 discloses a soundproof arrangement, in which an attaching plate which is formed of rubber material, resin material, etc. and is deformable is detachably attached to a top plate of a mower deck, and a sound shield member having air communication hole is provided in this attaching plate and also a deformable soundproof member is provided under this sound shield member.

[1] An object corresponding to Related Art [1] above is as follows.

An object of the present invention is to provide a mower unit capable of efficiently cooling a mower motor for rotating a cutter blade.

[2] An object corresponding to Related Art [2] above is as follows.

With the soundproof arrangement disclosed in Japanese Unexamined Patent Application Publication No. Hei. 6-133617, vibration of a housing due to vibration of the bevel gear accommodation case can be suppressed, whereas solid propagation sound propagated from other part than the bevel gear accommodation case to the mower deck can not be suppressed.

Further, in the case of the soundproof arrangement disclosed in e.g. JP No. 2002-345317 wherein the sound shield member is attached via the attaching plate to the mower deck, it is difficult to suppress sold propagation sound propagated to the mower deck, in particular, the solid propagation sound which is propagated to the top plate having a large area. Moreover, with attachment of a large soundproof member to the mower deck, since this member per se can be vibrated, the arrangement is inconvenient for effective suppression of the sold propagation sound propagated to the mower deck.

In view of the above-described state of the art, an object of the present invention is to provide a simple soundproof arrangement capable of effective suppression of solid propagation sound propagated to the mower deck.

SUMMARY OF THE INVENTION

[1] An inventive solution corresponding to Object [1] above is as follows.

An inventive mower unit to be mounted to a grass mower comprises: a mower deck having a top wall and a side wall extending downwards from an edge of the top wall;

a rotational shaft extending from an inner space formed by the top wall and the side wall and extending upwards through the top wall;

a cutter blade attached to a lower portion of the rotational shaft within the inner space;

a mower motor having a rotor and a coil which are disposed along an axial direction of an output shaft;

a power transmission mechanism for transmitting power from the output shaft to the cutter blade;

a mount deck having a horizontal mounting face for mounting the mower motor in such a manner that the output shaft assumes a vertical posture, the mount deck protruding outwards from the side wall; and a cooling arrangement incorporated in the mound deck for discharging heat of the mower motor.

With the above-described arrangement, heat generated at the motor and transferred to the mount deck is further transferred to the mower deck from which it is discharged, and discharged also by the cooling arrangement incorporated in the mount deck. Since heat generated at the mower motor is discharged via two heat discharging channels, the mower motor can be cooled in an efficient manner.

Cooling of the coil which acts as a heat generation source in a motor is important for motor cooling. Then, according to one preferred embodiment of the present invention, the coil is disposed downwardly of the rotor in the axial direction of the output shaft and disposed in close vicinity of the mount deck. With this arrangement, the coil as a heat generation source can be heat-discharged in an efficient manner via the cooling arrangement incorporated in the mount deck.

In a cooling arrangement, one component having high cooling effect is a heat discharging fin. For this reason, according to one preferred embodiment of the present invention, as the cooling arrangement, a heat discharging fin is formed in a back side of the mounting face. In particular, in the present invention, the mounting face of the mount deck is formed as a horizontal face, if a perpendicularly downwardly oriented heat discharging fin is formed from its back side, the distance between the mounting face and the heat discharging fin is made short, thus providing higher cooling effect. Further, since this heat discharging fin serves also as a reinforcing rib for the mount deck, the mounting face for mouthing the mower motor can be formed of a thin plate.

In association with rotation of the cutter blade, air is introduced (sucked or drawn) from the outside into the mower deck. In the course of this, an amount of air introduced into the mower deck past the lower end of the side wall from the rear side of the mower deck tends to be greater than an amount of air introduced from the other portions. Therefore, it will be advantageous if air flows into the mower deck from the rear side of this mower deck is utilized for cooling. In this, if the heat discharging fin is arranged to extend along the air flow direction, this will improve communication of the air with the heat discharging fin, thus improving the heat discharging effect. Therefore, according to one preferred embodiment of the present invention, the mount deck is disposed rearwardly of the side wall positioned at a rear portion of the mower deck; and the heat discharging fin extends along the flow of air introduced into the inner space in association with rotation of the cutter blade.

Since a cooling arrangement such as the heat discharging fin is formed in the mount deck, heat transferred to the mount deck from the mower motor is discharged via the heat discharging fin. For further enhancement of heat discharging effect of the mount deck, an arrangement that allows additional discharge of heat via the other part than the heat discharging fin will be preferred. For this reason, according to one preferred embodiment of the present invention, the mount deck is connected to the side wall in such a manner as to be able to transfer heat thereto. With this arrangement, heat transferred to the mount deck from the mower motor is discharged also via the side wall. Since the side wall of the mower deck is constantly cooled by air current generated by the cutter blade at the time of driving of the mower motor, this side wall can be utilized as an effective heat sink.

If a gap is formed between the mounting face of the mount deck and a mounting face of the mower motor, this will cause deterioration in heat transfer, thus leading to inconvenience of heat generated at the mower motor not exiting this mower motor speedily. In order to avoid formation of such gap, preferably, a gapless fitting sheet or grease, etc. is interposed between the mounting face of the mount deck and the mounting face of the mower motor. In this case, as such gapless fitting sheet or grease, a heat discharging sheet or heat discharging grease having high heat transferring ability is used advantageously. Therefore, according to one preferred embodiment of the present invention, the mower motor is mounted to the mounting face via a heat discharging sheet or heat discharging grease.

[2] An inventive solution corresponding to Object [2] above is as follows.

An inventive mower unit to be mounted to a grass mower comprises:

a mower deck having a top wall and a side wall extending downwards from the top wall;

a rotational shaft extending through the top wall and rotatably supported to the top wall;

a cutter blade attached to the rotational shaft inside the mower deck;

a power supply unit for supplying power to the rotational shaft; and a soundproof sheet stuck to a plate face of the mower deck.

With the above-described arrangement, since a soundproof sheet is directly stuck to the plate face of the mower deck, solid propagation sound propagated to the mower deck can be effectively absorbed. In a mower deck, noise will be generated as noise due to air flow of cut grass flow in association with rotation of the cutter blade, noise due to rotation or vibration of the power supply unit for transmitting power to the cutter blade, noise due to vibration of the bowl-shaped mower deck acting as a "resonance box" to which such noises are propagated. These noises can be effectively reduced by the soundproof sheet stuck to the plate face.

Inside the mower deck, one or more cutter blades are disposed side by side. So, its top plate has a large area and the solid propagation sound propagated in the top plate significantly affects noise. For this reason, according to one preferred embodiment of the present invention, the soundproof sheet is stuck to the top plate. Since the top plate has a flat face having a large area, a large-sized soundproof sheet can be stuck thereto easily. With this, significant noise reduction can be realized at low cost.

According to one preferred embodiment of the present invention, the soundproof sheet is covered by a label sheet. Since the mower deck has a mechanism for rotating its cutter blade(s), various warning information is displayed in the form of label sheet. And, this label sheet is designed not only to give caution to a person, but also not to give minimal possible impairment to the aesthetic appearance of the mower deck. Thus, by covering the soundproof sheet with such label sheet, there is obtained an advantage that the aesthetically not so pleasant soundproof sheet can be non-visible.

According to a still further preferred embodiment of the present invention, the label sheet extends beyond a circumferential edge of the soundproof sheet, so that a borderline between the circumferential edge of the soundproof sheet and the face of the mower deck is sealed by the label sheet. With this arrangement, possible deterioration in bonding of the soundproof sheet due to intrusion of dust or the like via a gap between the soundproof sheet and the plate face of the mower deck and reduction in the soundproof effect of the soundproof sheet due to exposure to sun light can be effectively suppressed.

DESCRIPTION OF THE INVENTION

First Embodiment

Figure 1:
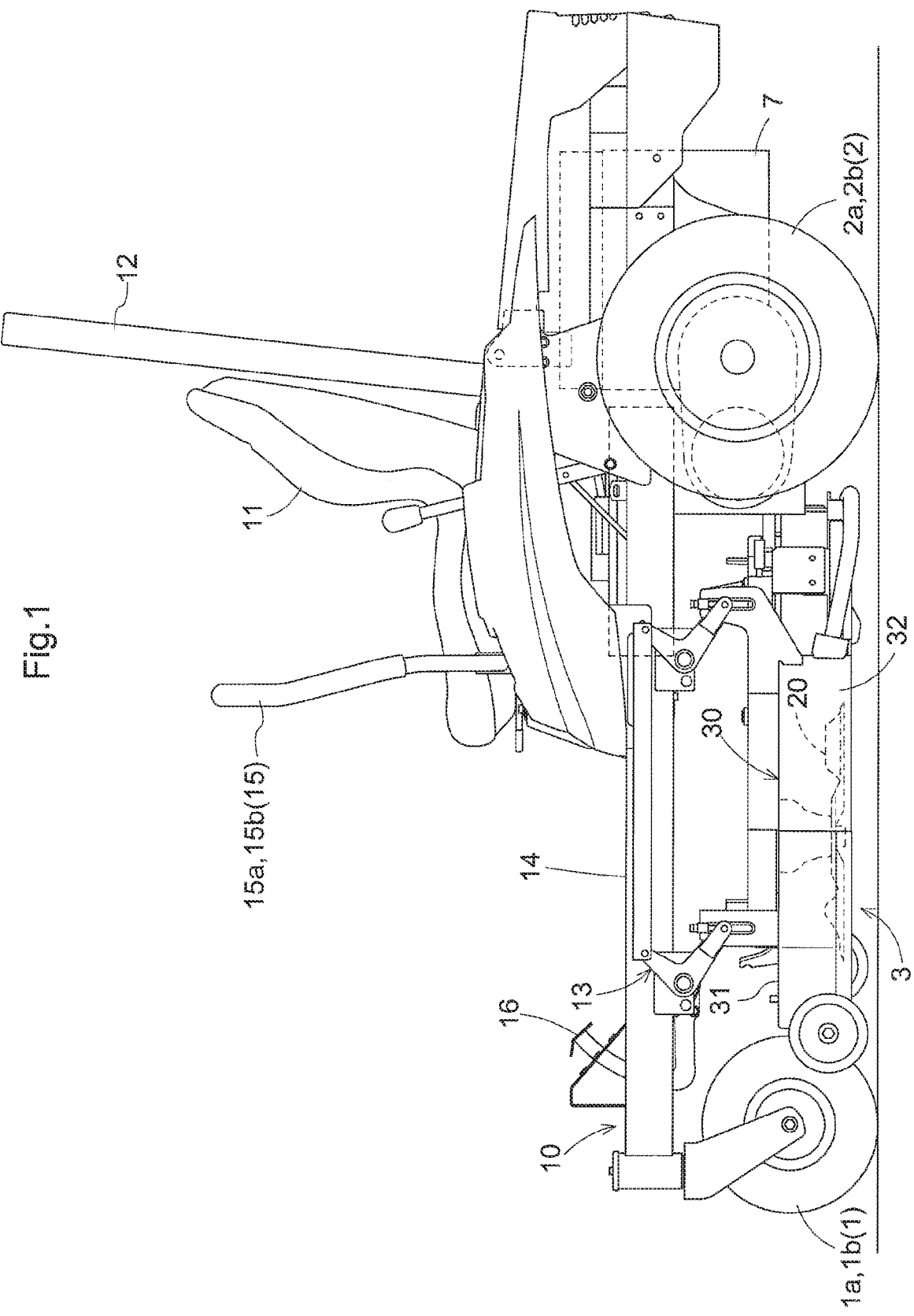
FIG. 1 is a view showing a first embodiment (applicable also to the subsequently numbered drawings up to FIG. 8), which is a side view of a mid-mount riding type electric powered grass mower mounting an inventive mower unit.

With reference to the accompanying drawings, a mid-mount riding type electric powered grass mower mounting one of a first embodiment as one example of an inventive mower unit will be explained. FIG. 1 is a side view of the grass mower. Incidentally, in the following description, unless indicated explicitly otherwise, a word "front" means a front side in a vehicle body front-rear direction (traveling direction), and a word "rear" means a rear side in the vehicle body front-rear direction (traveling direction). Further a right-left direction or a transverse direction means a vehicle body transverse direction (vehicle body width direction) perpendicular to the vehicle body front-rear direction. A word "upper" or "lower" refers to positional relationship relative to the perpendicular direction of the vehicle body (vertical direction), designating relationship in the ground clearance height.

This grass mower includes a vehicle body frame 10 supported by a front wheel unit 1 consisting of a caster type left front wheel 1a and a caster type right front wheel 1b which are freely rotatable and a drive wheel unit 2 consisting of a left rear wheel 2a and a right rear wheel 2b, a battery 7 disposed at a rear portion of the vehicle body frame 10, a driver's seat 11 disposed forwardly of the battery 7, a ROPS frame 12 vertically mounted from a rear side of the driver's seat 11, and a mower unit 3 mounted between the front wheel unit 1 and the drive wheel unit 2 in a space under the vehicle body frame 10 and suspended from the vehicle body frame 10 to be liftable up/down via a lift link mechanism 13.

Forwardly of the driver's seat 11, there is provided a floor plate 14 acting as a footrest for the driver. And, from this floor plate 14, a brake pedal 16 protrudes. On opposed sides of the driver's seat 11, there is mounted a maneuvering unit 15 consisting of a left maneuvering lever 15a and a right maneuvering lever 15b. The left maneuvering lever 15a and the right maneuvering lever 15b are both pivotable about a horizontal pivot axis extending in the vehicle body transverse direction.

Figure 2:
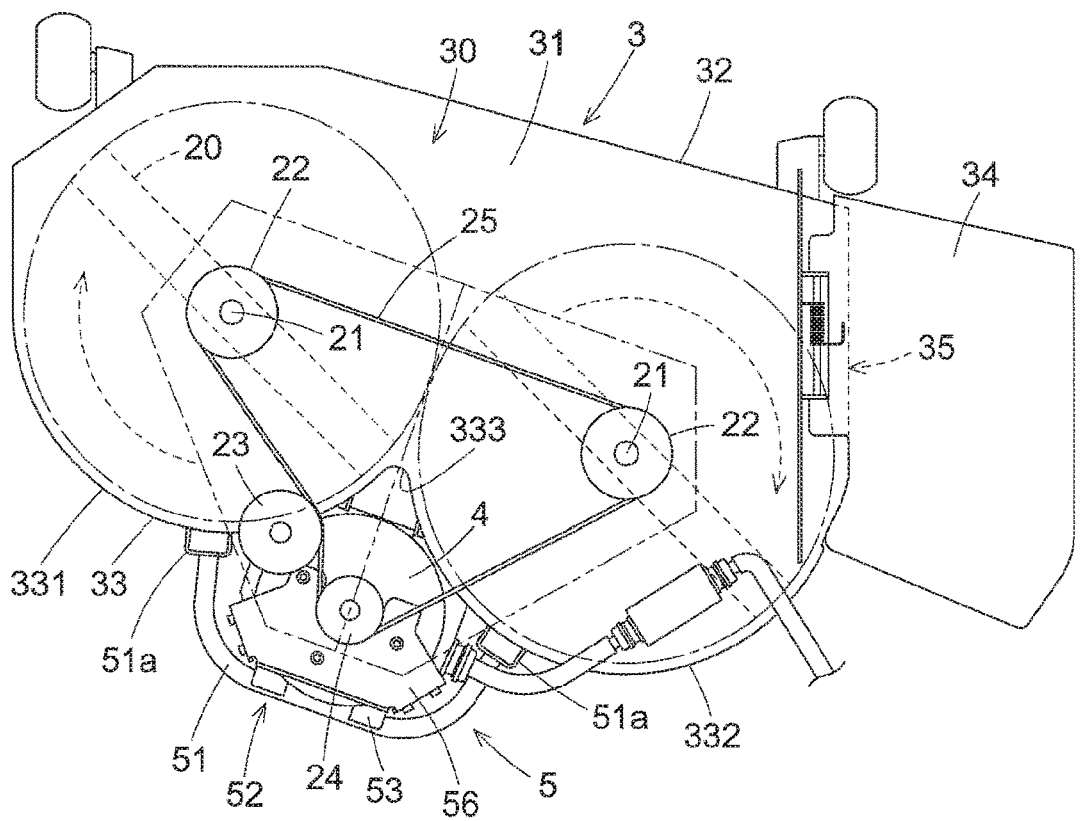
FIG. 2 is a plan view of the mower unit.

The mower unit 3, as shown in FIG. 1 and FIG. 2, is a side discharge type. The mower unit 3 includes a mower deck 30 and two rotary cutter blades 20. The cutter blade 20 on the left side and the cutter blade 20 on the right side are disposed side by side in the vehicle body transverse direction. The mower deck 30 includes a top wall 31, and a front side wall 32 and a rear side wall 33 which extend downward from an outer circumferential edge of the top wall 31. The front side wall 32 is continuous with a front-side outer circumferential edge of the top wall 31. The rear side wall 33 is continuous with a rears-side outer circumferential edge of the top wall 31. Right-end areas of the front and rear side walls 32 and 33 are cutout, thus forming a cut grass discharge opening 35 covered by a cover 34. Each cutter blade 20 is disposed in an inner space of the mower deck 30 formed by the top wall 31, the front side wall 32 and the rear side wall 33. Each cutter blade 20 is fixed to a lower portion, in this embodiment, a lower end, of a rotational shaft 21 that extends downward through the top wall 31 of the mower deck 30. The rotational shaft 21 is rotatably supported to the top wall 31 with using a bearing. To an upper end of each rotational shaft 21, a pulley 22 is attached.

The cutter blade 20 is formed like a band plate with cutting blade edges being formed at opposed ends thereof. And, on the back side of the cutting edges, wind generating vanes are formed. At the time of a grass cutting work, the grass mower will travel with the cutter blades 20 being rotated, whereby grass clippings cut by the cutter blades 20 will be guided by a baffle plate inside the mower deck 30 with a conveying air current generated by the wind generating vanes of the cutter blades 20 to pass through the inside of the mower deck 30 to be discharged to the lateral outer side of the mower deck 30 via the cut grass discharge opening 35.

The rear side wall 33 consists of a left arc portion 331, a right arc portion 332 and a curved portion 333 bridging therebetween, which are bent to extend along a rotational path of the cutter blade 20 adjacent respectively thereto as seen in a plan view. In a space that extends from the curved portion 333 to and across the left arc portion 331 and the right arc portion 332, there is provided a mount deck 5 for mounting a mower motor 4.

Figure 3:
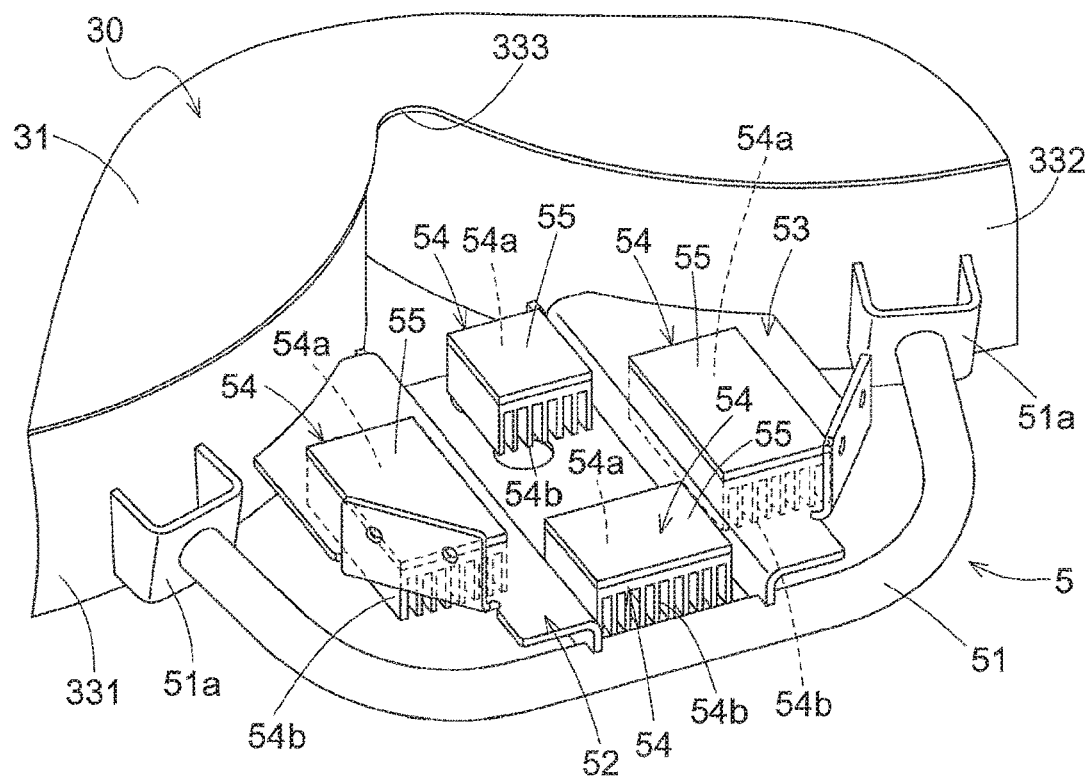
FIG. 3 is a perspective view of a mount deck.

In the instant embodiment, as shown in FIG. 3, the mount deck 5 protrudes outwards from the rear side wall 33, in this embodiment, rearwardly thereof. The mount deck 5 consists of a curved frame 51 formed of pipe, and a mounting bracket 52 fixed to this curved frame 51. At opposed ends of the curved frame 51, fixing brackets 51a are provided. These fixing brackets 51a are fixed to the left arc portion 331 and the right arc portion 332, respectively. Fixing between the fixing bracket 51a and the left arc portion 331 and between the fixing bracket 51a and the right arc portion 332 comprise bonding via contact over a large face so as to maximize heat transfer therebetween. Similarly, the bonding between the fixing bracket 51a and the curved frame 51 and the bonding between the mounting bracket 52 and the curved frame 51 are done via large face contact for maximum heat transferability.

A base 53 of the mounting bracket 52 consists of a pair of left and right angle members and a center plate interconnecting lower ends of these angle members. In this base 53, four motor receiving decks 54 are incorporated. Each motor receiving deck 54 includes a flat face-like mounting face 54a on its front side and includes, on its back side, a plurality of arrays of heat discharging fins 54b extending downwards as a cooling arrangement 50. The motor receiving deck 54 is fixed to the base 53 in such a manner that the mounting face 54a is set horizontal. In this, the two left and right motor receiving decks 54 are engaged in openings defined in the angle plate of the base 53 and bonded to the base 53 by means of e.g. welding. The two front and rear motor receiving decks 54 are mounted on the center plate of the base 53. As the heights of all of the mounting faces 54a are designed for enabling appropriate mounting of the mower motor 4, with mounting of the motor 4 on the mounting faces 54a, the motor 4 assumes an appropriate posture. Between the mounting faces 54a and the mower motor 4, a heat discharging medium 55 (see FIG. 5) such as a heat discharging sheet, heat discharging grease, etc. can be provided for reducing loss in heat transfer from the mower motor 4 to the mounting faces 54a. The mower motor 4 is fixed to the base 53 via a motor fixing bracket 56 having a shape to cover the mower motor 4 from above. Preferably, the motor receiving decks 54 are formed of aluminum alloy having high heat conductivity.

Figure 4:
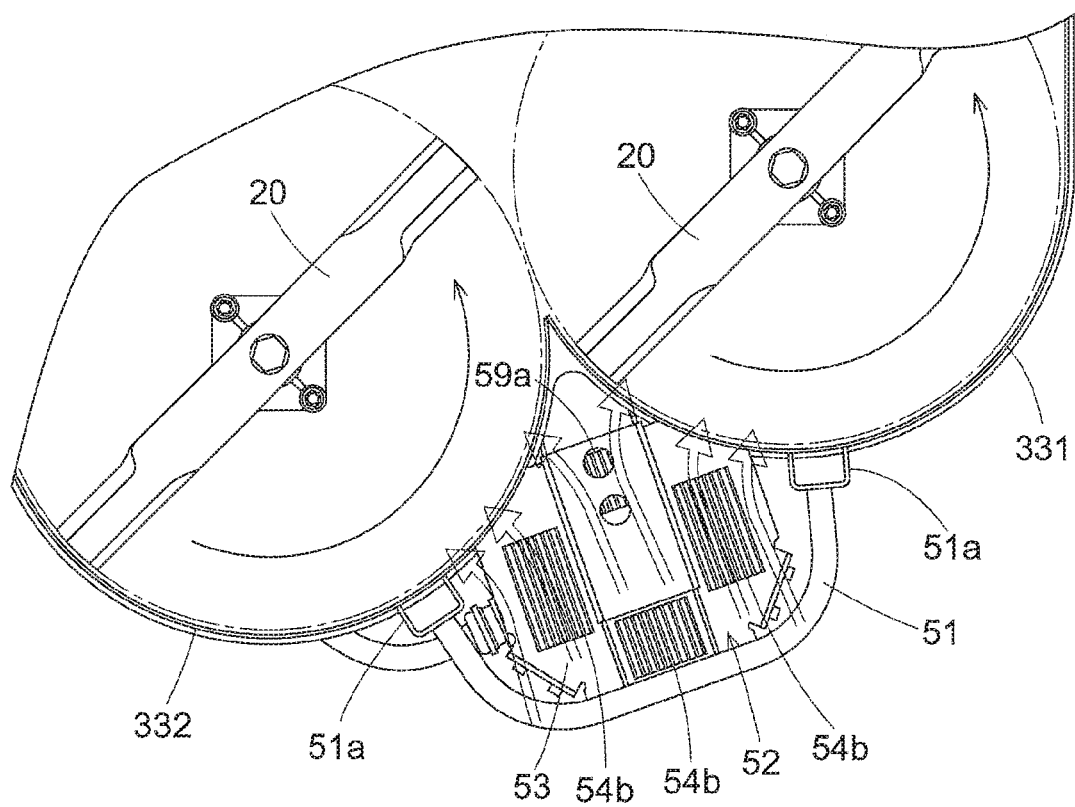
FIG. 4 is a bottom view of the mower deck.

As shown in FIG. 3 and FIG. 4, each heat discharging fin 54b extends in the front-rear direction. As a result, an air passage formed between the respective adjacent heat discharging fins 54b extends along in the front-rear direction also. As air is introduced (sucked or drawn) to the inside of the mower deck 30 from the outside in association with rotation of the cutter blades 20, there is generated an air current that flows in the front-rear direction from the rear side of the mower deck 30 to pass the air passages of the heat discharging fins 54b to reach the lower end of the rear side wall 33 of the mower deck 30. When this air current passes through the air passages of the respective heat discharging fins 54b at high speeds, heat is removed efficiently from the heat discharging fins 54b.

Figure 5:
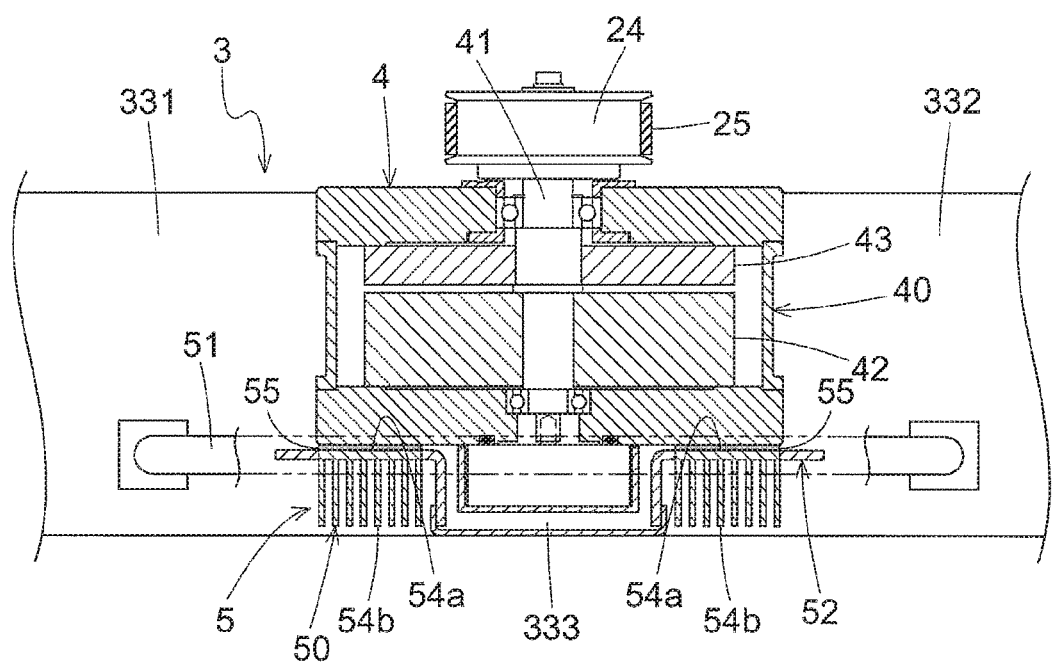
FIG. 5 is a vertical section of a mower motor and the mount deck.

The mower motor 4, as shown in FIG. 5 is a motor having a flat shape, called also a "pancake motor". An output shaft 41 of the mower motor 4 is rotatably supported to a motor housing 40 under a vertical posture via a bearing, and an upper end of the shaft 41 protrudes from the motor housing 40. To this protruding portion of the output shaft 41, an output pulley 24 is attached. And, a belt 25 is entrained around the pulleys 22 of the two rotational shafts 21, the output shaft 41 and a tension pulley 23. Namely, in the instant embodiment, a power transmission mechanism for transmitting power from the output shaft 41 to the respective cutter blade 20 is constituted of a belt transmission mechanism.

Inside the motor housing 40, an excitation coil 42 as the coil of the mower motor 4 is disposed around the output shaft 41, and a rotor 43 rotated by magnetic flux from this excitation coil 42 is fixed to the output shaft 41. The excitation coil 42 is attached gaplessly to the bottom of the motor housing 40. Also, the rotor 43 is disposed upwardly of the excitation coil 42. Namely, the rotor 43 is disposed upwardly of the output shaft 41 in the axial direction and the excitation coil 42 is disposed downwardly of the rotor 43 in the axial direction of the output shaft 41. With this arrangement, heat generated at the excitation coil 42 is transferred from the bottom of the motor housing 40 via the mounting faces 54a to the mounting bracket 52. A portion of the heat transferred to the mounting bracket 52 will be discharged from the heat discharging fins 54b and a portion of the remaining heat will be transferred further via the curved frame 51 to the motor housing 40 to be discharged therefrom.

Figure 6:
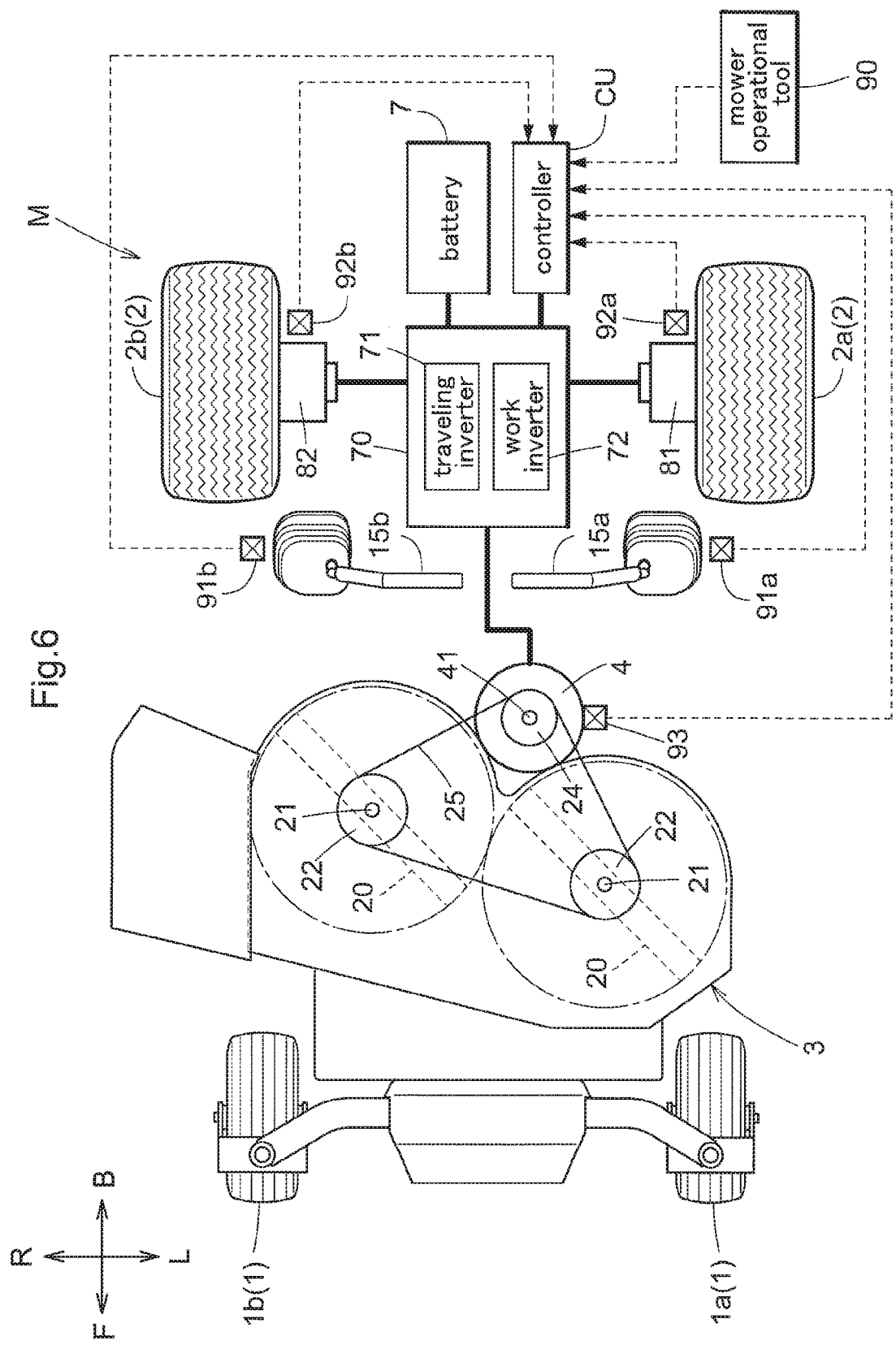
FIG. 6 is a power system diagram of the grass mower.

As shown in FIG. 6, to a left motor 81 and a right motor 82 which respectively are electric motors for rotatably driving the left rear wheel 2a and the right rear wheel 2b, and to the mower motor 4, electric power is supplied from an inverter section 70. This inverter section 70 includes a traveling inverter 71 for supplying power to the left motor 81 and the right motor 82 and a work inverter 72 for supplying power to the mower motor 4. The inverter section 70 is driven based on control signals from a controller CU.

To the controller CU, there are connected a mower operational tool 90, a left steering angle detection sensor 91a, a right steering angle detection sensor 91b, a left rotation detection sensor 92a, a right rotation detection sensor 92b, and a mower rotation detection sensor 93. The mower operational tool 90 is used for effecting ON/OFF of the mower motor 4, and adjustment of rotational speed thereof. The left steering angle detection sensor 91a detects a pivotal angle of the left maneuvering lever 15a. The right steering angle detection sensor 91b detects a pivotal angle of the right maneuvering lever 15b. The left rotation detection sensor 92a detects a rotational speed of the left motor 81. The right rotation detection sensor 92b detects a rotational speed of the right motor 82. The mower rotation speed sensor 93 detects a rotational speed of the mower motor 4.

The controller CU obtains a rotational speed of the left rear wheel 2a, i.e. a rotational speed of the left motor 81, based on operational information via the left steering angle detection sensor 91a for detecting an operational amount of the left maneuvering lever 15a and sends a control signal to the traveling inverter 71. The controller CU obtains a rotational speed of the right rear wheel 2b, i.e. a rotational speed of the right motor 82, based on operational information via the right steering angle detection sensor 91b for detecting an operational amount of the right maneuvering lever 15b and sends a control signal to the traveling inverter 71. As respective rotational speeds of the left motor 81 and the right motor 82 are varied independently based on the amounts of electric power supplied via the traveling inverter 71 to the left motor 81 and the right motor 82 independently, the rotational speeds of the left rear wheel 2a and the right rear wheel 2b can be made different from each other. By a resultant speed difference between the left and right rear wheels, a turning of the grass mower is effected.

Further Embodiments of First Embodiment (1) In the foregoing embodiment, the excitation coil 42 of the mower motor 4 is disposed downwardly of the rotor 43 in the axial direction of the output shaft 41. Instead, the rotor 43 can be disposed downwardly of the excitation coil 42.

Figure 7:
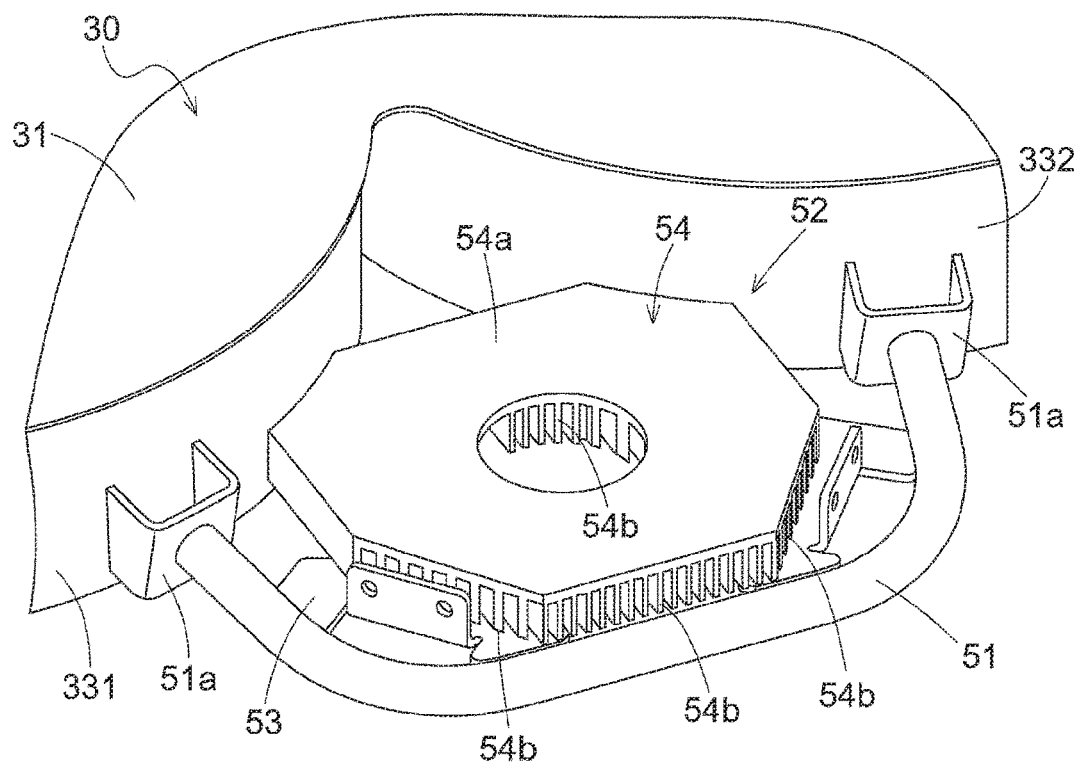
FIG. 7 is a perspective view of a mount deck in a further embodiment.
Figure 8:
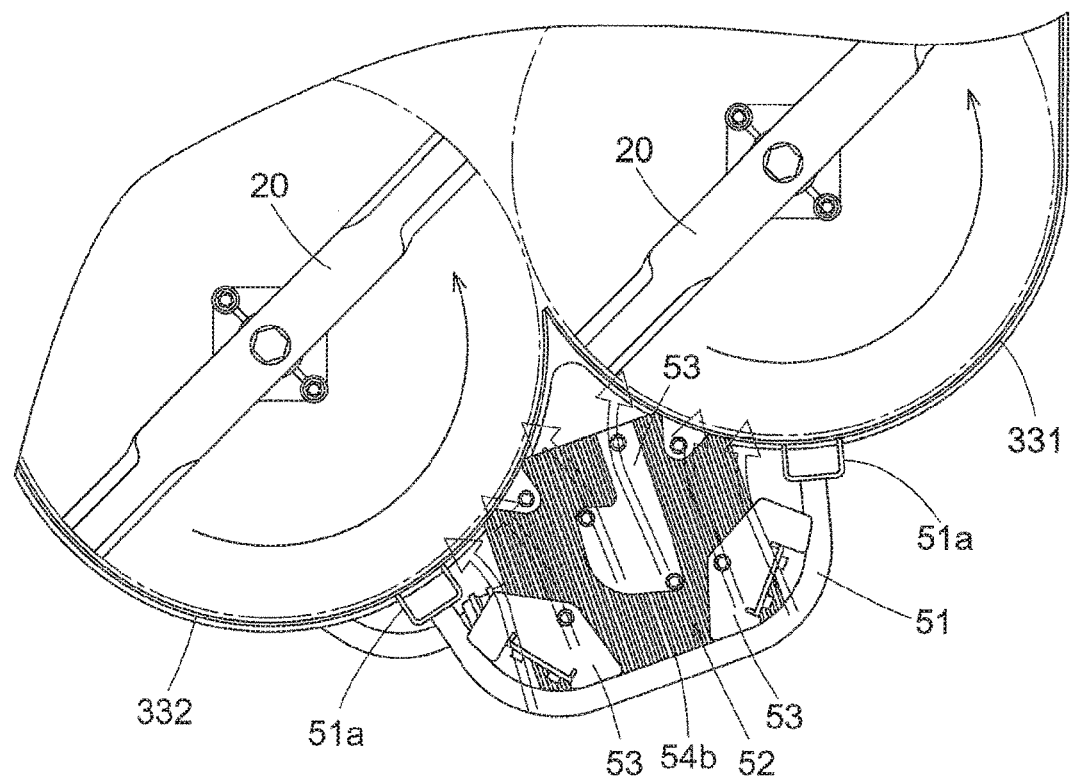
FIG. 8 is a bottom view of the mount deck in the further embodiment.

(2) In the foregoing embodiment, the mounting bracket 52 of the mount deck 5 is comprised of the base 53 and the plurality of motor receiving decks 54 attached to the base 53. Instead, the motor receiving decks 54 can be provided as a single unitary component. In the case of such modified mounting bracket 52, as shown in FIG. 7 and FIG. 8, a plurality of bases 53 are fixed to the curved frame 51 and fixed to the left arc portion 331 and the right arc portion 332 which are parts of the rear side wall 33 of the mower deck 30. And, the respective surfaces of the plurality of bases 53 together form a single horizontal face. And, to this horizontal face, i.e. the plurality of bases 53, a polygonal-shaped thick plate member formed of aluminum alloy is attached as the unitary motor receiving deck 54. The surface of this motor receiving deck (thick plate member) 54 is a flat face defining a through hole at the center thereof, to be used as a mounting face 54a. In the back face of this motor receiving deck (thick plate member) 54, a plurality of arrays of heat discharging fins 54b are formed directly. And, the motor receiving deck 54 is attached to the base 53 in such a manner that these heat discharging fins 54b extend in the front-rear direction.

Second Embodiment

Figure 9:
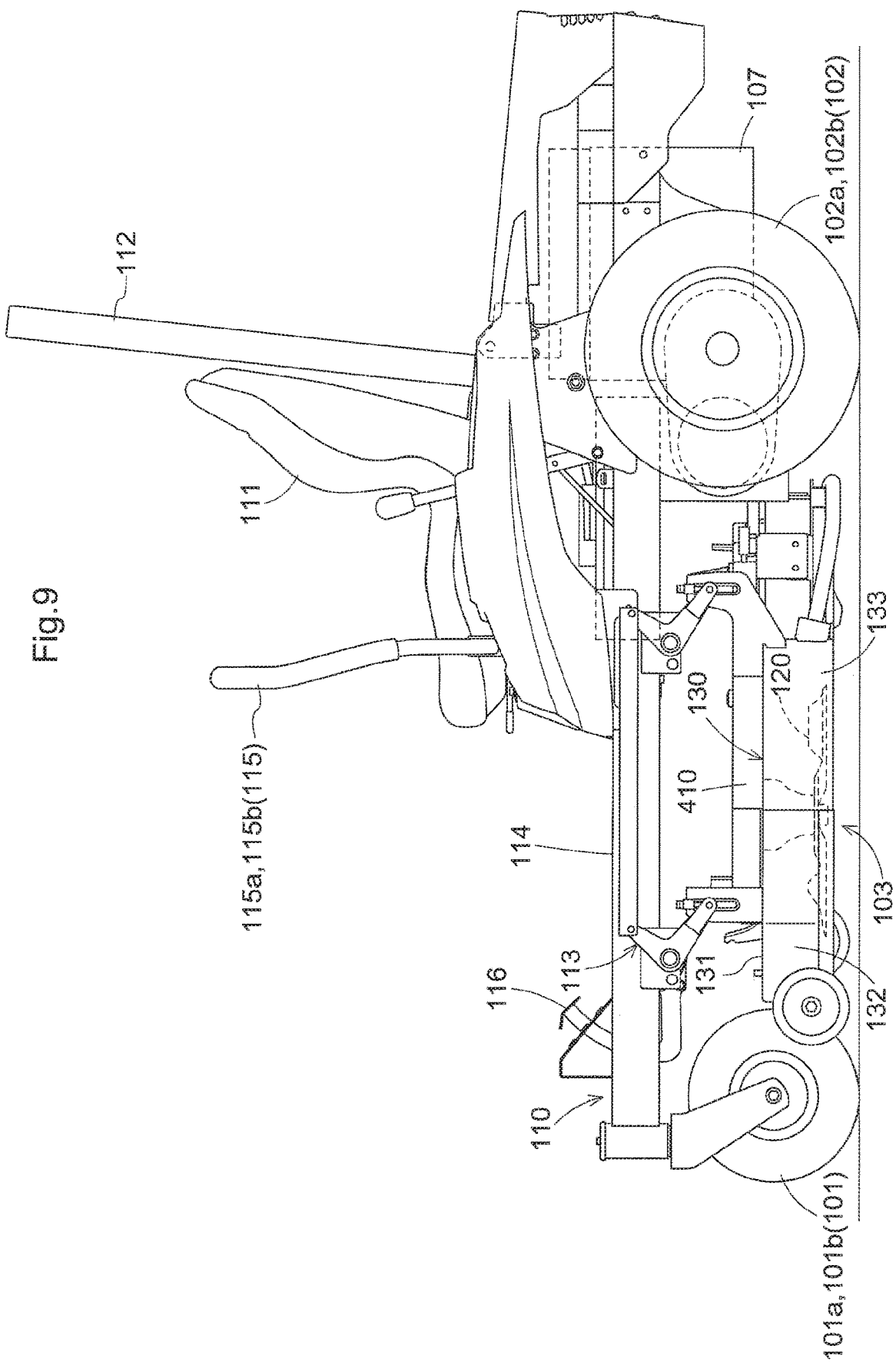
FIG. 9 is a view showing a second embodiment (applicable also to the subsequently numbered drawings up to FIG. 13), which is a side view of a grass mower mounting an inventive mower unit.

With reference to the accompanying drawings, a grass mower mounting one of a second embodiment as one example of an inventive mower unit will be explained. In this embodiment, the grass mower comprises a mid-mount riding type electric powered grass mower. FIG. 9 is a side view of the grass mower. Incidentally, in the following description, unless indicated explicitly otherwise, a word "front" means a front side in a vehicle body front-rear direction (traveling direction), and a word "rear" means a rear side in the vehicle body front-rear direction (traveling direction). Further, a right-left direction or a transverse direction means a vehicle body transverse direction (vehicle body width direction) perpendicular to the vehicle body front-rear direction. A word "upper" or "lower" refers to positional relationship relative to the perpendicular direction of the vehicle body (vertical direction), designating relationship in the ground clearance height.

This grass mower includes a vehicle body frame 110 supported by a front wheel unit 101 consisting of a caster type left front wheel 101a and a caster type right front wheel 101b which are freely rotatable and a drive wheel unit 102 consisting of a left rear wheel 102a and a right rear wheel 102b, a battery 107 disposed at a rear portion of the vehicle body frame 110, a driver's seat 111 disposed forwardly of the battery 107, a ROPS frame 112 vertically mounted from a rear side of the driver's seat 111, and a mower unit 103 mounted between the front wheel unit 101 and the drive wheel unit 102 in a space under the vehicle body frame 110 and suspended from the vehicle body frame 110 to be liftable up/down via a lift link mechanism 113.

Forwardly of the driver's seat 111, there is provided a floor plate 114 acting as a footrest for the driver. And, from this floor plate 114, a brake pedal 116 protrudes. On opposed sides of the driver's seat 111, there is mounted a maneuvering unit 115 consisting of a left maneuvering lever 115a and a right maneuvering lever 115b. The left maneuvering lever 115a and the right maneuvering lever 115b are both pivotable about a horizontal pivot axis extending in the vehicle body transverse direction.

Figure 10:
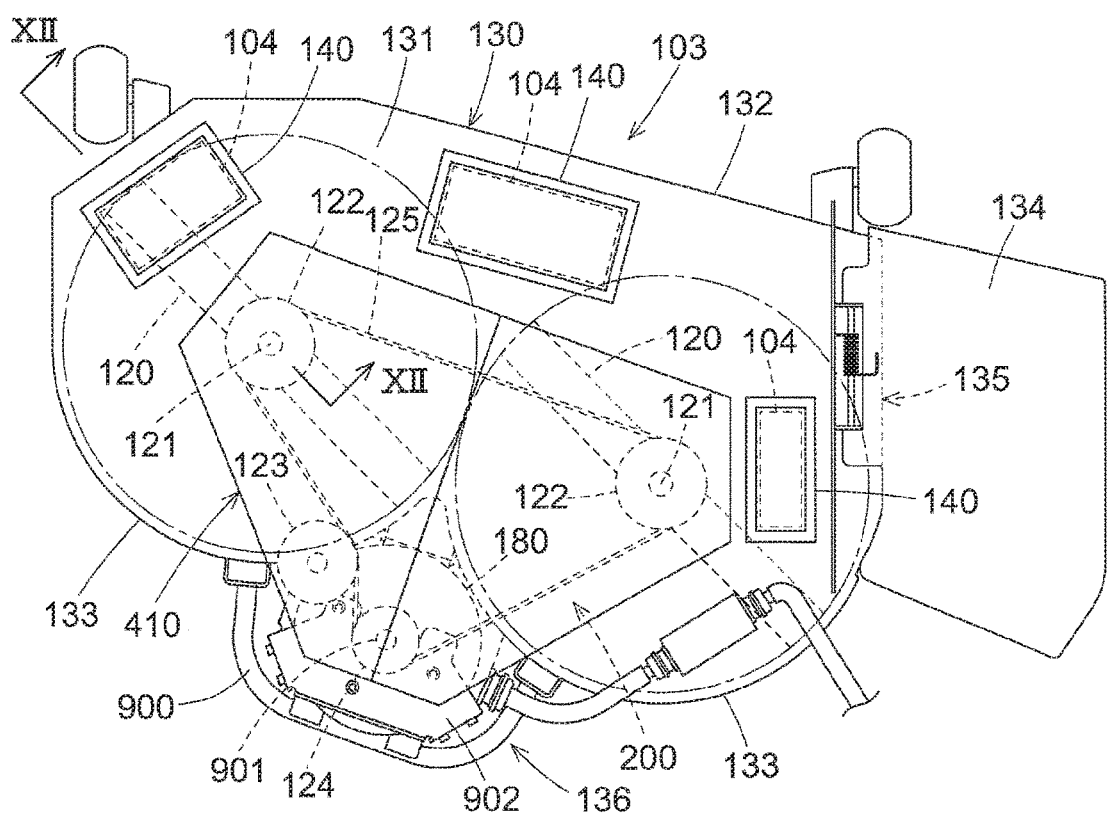
FIG. 10 is a plan view of the mower unit with a belt cover attached thereto.
Figure 11:
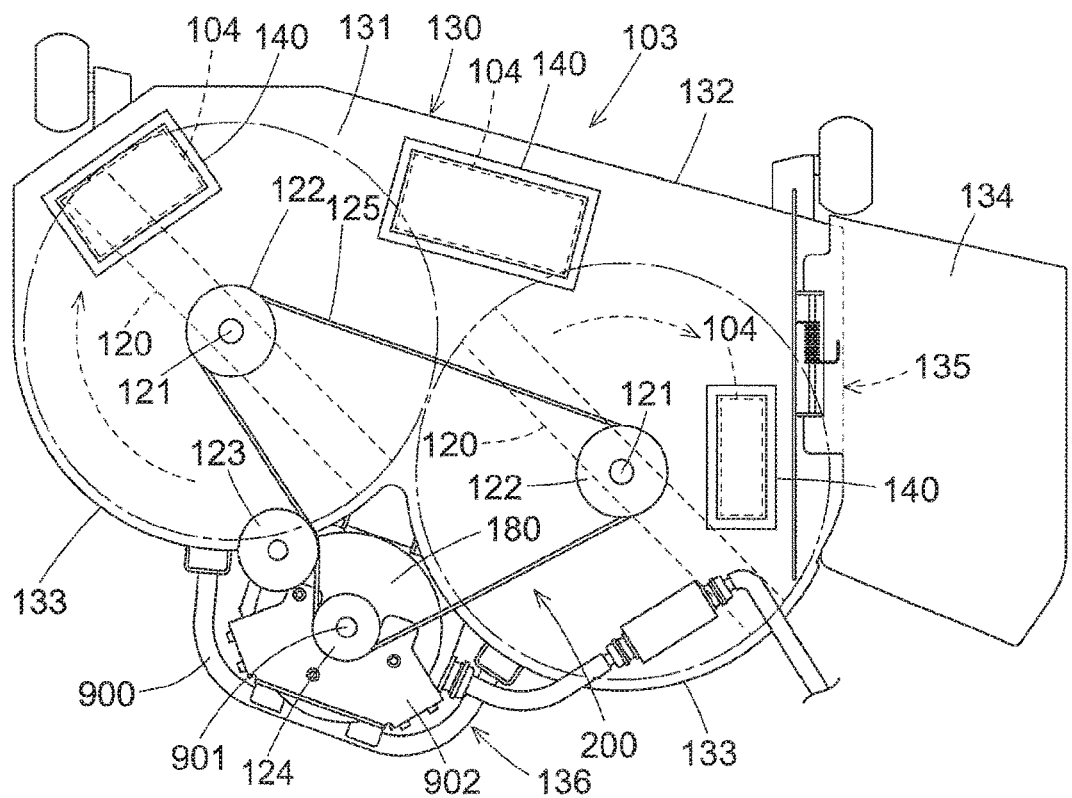
FIG. 11 is a plan view of the mower unit with the belt cover detached therefrom.

FIG. 10 is a plan view of the mower unit 103 with a belt cover 410 attached thereto. FIG. 11 is a plan view of the mower unit 103 with the belt cover 410 detached therefrom. The mower unit 103, as shown in FIG. 10 and FIG. 11, is a side discharge type. The mower unit 103 includes a mower deck 130 and two rotary cutter blades 120. The cutter blade 120 on the left side and the cutter blade 120 on the right side are disposed side by side in the vehicle body transverse direction. The mower deck 130 includes a top plate 131, and a front side plate 132 and a rear side plate 133 which extend downward from an outer circumferential edge of the top plate 131. The front side plate 132 is continuous with a front-side outer circumferential edge of the top plate 131. The rear side pate 133 is continuous with a rears-side outer circumferential edge of the top plate 131. Right-end areas of the front and rear side plates 132 and 133 are cutout, thus forming a cut grass discharge opening 135 covered by a cover 134. Each cutter blade 120 is disposed in an inner space of the mower deck 130 formed by the top plate 131, the front side plate 132 and the rear side plate 133.

Figure 12:
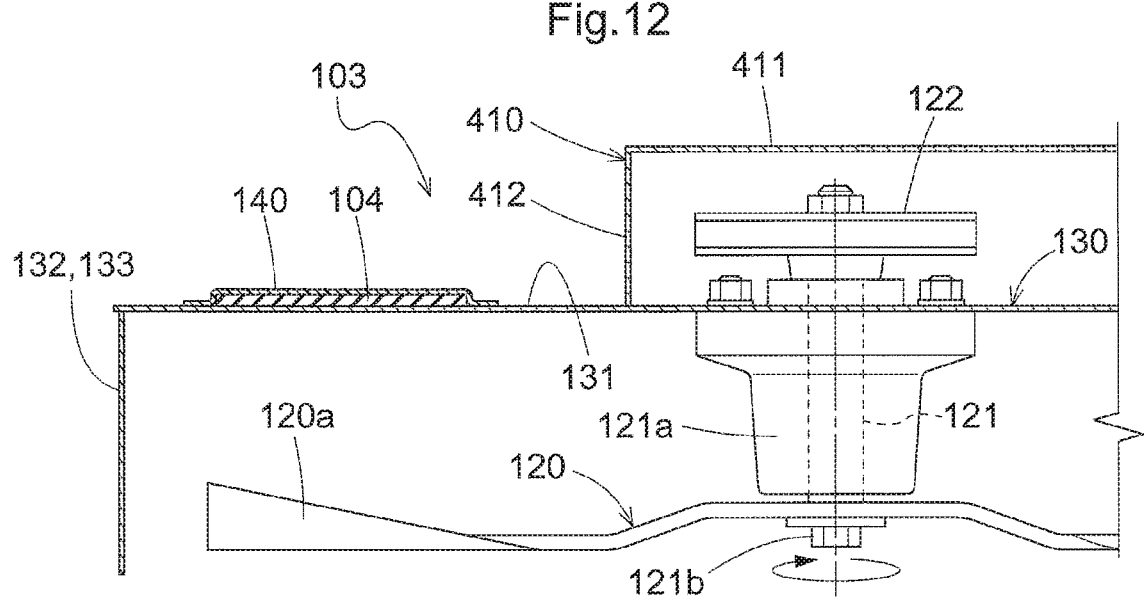
FIG. 12 is a section view showing a soundproof sheet covered by a label sheet.

As shown in FIG. 12, each cutter blade 120 is formed like an elongate band plate with cutting blade edges being formed at opposed ends thereof. On the rear side of these cutting blade edges, wind generating vanes 120a are formed. At the time of a grass cutting work, the grass mower will travel with the cutter blades 120 being rotated, whereby grass clippings cut by the cutter blades 120 will be guided by a baffle plate inside the mower deck 130 with a conveying air current generated by the wind generating vanes 120a of the cutter blades 20 to pass through the inside of the mower deck 130 to be discharged to the lateral outer side of the mower deck 130 via the cut grass discharge opening 135.

A rotational shaft 121 extending downwards through the top plate 131 of the mower deck 130 is rotatably supported to the top late 131 via a bearing unit 121a. Each cutter blade 120 is fastened and fixed to the lower end of the rotational shaft 121 by a mounting bolt 121b to be replaceable. To the upper end of the rotational shaft 121, an input pulley 122 is attached.

As shown in FIG. 11, a mower motor 180 for supplying power to the cutter blades 120 is mounted on a mount deck 136 which protrudes rearwards from the rear side plate 133. An output shaft 901 of the mower motor 180 is rotatably supported via a bearing under a vertical posture inside a motor housing 902, with an upper end thereof protruding from the motor housing 902. To this protruding portion of the output shaft 901, an output pulley 124 is attached.

Around the input pulleys 122 attached to the two rotational shafts 121, the output pulley 124 attached to the output shaft 901 of the mower motor 180 and a tension pulley unit 123 attached to the mower deck 130, a belt 125 is entrained. Namely, in this embodiment, a power supply unit 200 for transmitting power of the mower motor 180 to the cutter blades 120 is comprised of the mower motor 180, the output pulley 124 attached to the output shaft 901 of the mower motor 180, the belt 125, the tension pulley unit 123 and the input pulleys 122.

In this embodiment, the input pulleys 122, the output pulley 124, the tension pulley unit 123 and the belt 125 are disposed near the surface of the top plate 131 and covered by a belt cover 410. This belt cover 410, as shown partially in FIG. 12, comprises a lid structure consisting of a horizontal plate 411 as a top wall and a vertical plate 412 as a side wall. In case the belt cover 410 is attached to the mower deck 130, the horizontal plate 411 of the belt cover 410 corresponds to the top plate 131 of the mower deck 130 and the vertical plate 412 of the belt cover 410 corresponds to the front side plate 132 or the rear side plate 133 of the mower deck 130.

As shown in FIG. 10, FIG. 11 and FIG. 12, to the surface(s) of the top plate 131 of the mower deck 130 and/or the horizontal plate 411 of the belt cover 410, a soundproof sheet 104 is stuck. In this embodiment, three such soundproof sheets 104 are stuck to three portions of the top plate 131. The number of the sheets 104 may be greater or smaller than three. The size and the number of soundproof sheets 104 can be appropriately chosen with experimental implementation of noise determination. As such soundproof sheets 104, commercially available sheets formed of high vibration absorbing material will be used.

Further, in this embodiment, as schematically shown in FIG. 12, the soundproof sheet 104 is completely covered by a label sheet 140. Namely, the label sheet 140 has a larger area than the soundproof sheet 104. And, the label sheet 140 extends beyond the circumferential edge of the soundproof sheet 104. With this arrangement, a gap forming a borderline between the circumferential edge of the soundproof sheet 104 and the top plate 131 of the mower deck 130 is sealed by the label sheet 140. Needless to say, the soundproof sheet 104 may be only partially covered by the label sheet 140.

On the surface of the label sheet 140, a message for danger avoidance or maintenance/inspection or a symbolic illustration are painted or provided. Incidentally, on the back face of the label sheet 140, an adhesive bonding layer having good bonding performance is formed so as to cover the soundproof sheet 104 and affix its outer circumferential portion to the top plate 131. With this, the soundproof sheet 104 can be fixed to the top plate 131. Needless to say, in case such bonding layer is formed on the soundproof sheet 104, this soundproof sheet 104 will be self-bonded to the top plate 131. So, the size of the label sheet 140 may be equal to or smaller than the size of the soundproof sheet 104 and such label sheet 140 may be bonded to the surface of the soundproof sheet 104. In any case, if the label sheet 140 employs a material such as PVC having higher durability than the soundproof sheet 104 formed of soft material and having problem in durability, the soundproof sheet 104 can be effectively protected. That is, by covering the soundproof sheet 104 by the label sheet 140 having superior weatherability, it becomes possible to use such soundproof sheet 104 having vibration absorbing ability improved at the cost of weatherability.

Figure 13:
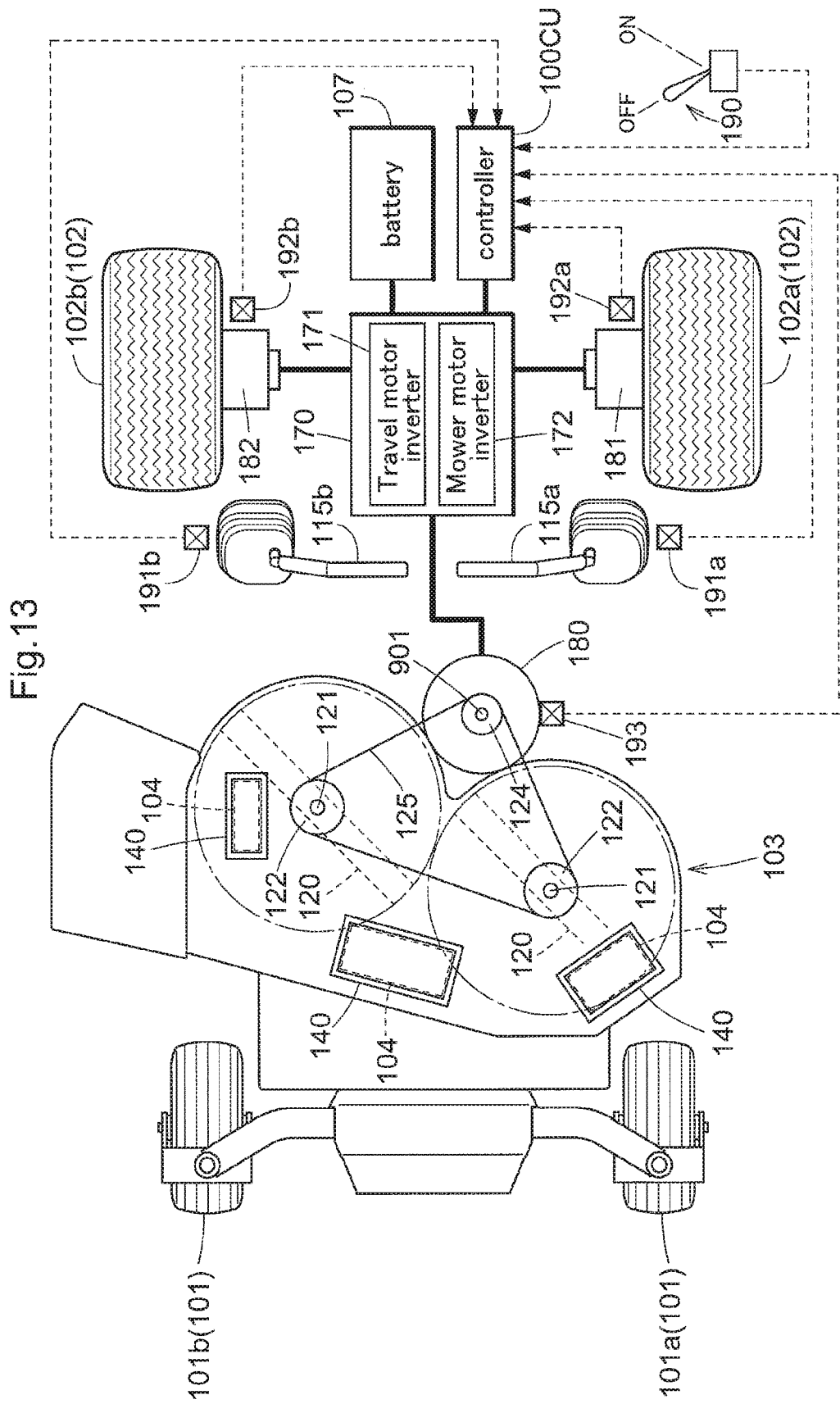
FIG. 13 is a power system diagram of the grass mower.

As shown in FIG. 13, to a left motor 181 and a right motor 182 which respectively are electric motors for rotatably driving the left rear wheel 102a and the right rear wheel 102b, and to the mower motor 180, electric power is supplied from an inverter section 170. This inverter section 170 includes a traveling inverter 171 for supplying power to the left motor 181 and the right motor 182 and a work inverter 172 for supplying power to the mower motor 180. The inverter section 170 is driven based on control signals from a controller 100CU.

To the controller 100CU, there are connected a mower operational tool 190, a left steering angle detection sensor 191a, a right steering angle detection sensor 191b, a left rotation detection sensor 192a, a right rotation detection sensor 192b, and a mower rotation detection sensor 193. The mower operational tool 190 is used for effecting ON/OFF of the mower motor 180, and adjustment of rotational speed thereof. The left steering angle detection sensor 191a detects a pivotal angle of the left maneuvering lever 115a. The right steering angle detection sensor 191b detects a pivotal angle of the right maneuvering lever 115b. The left rotation detection sensor 192a detects a rotational speed of the left motor 181. The right rotation detection sensor 192b detects a rotational speed of the right motor 182. The mower rotation speed sensor 193 detects a rotational speed of the mower motor 180.

The controller 100CU obtains a rotational speed of the left rear wheel 102a, i.e. a rotational speed of the left motor 181, based on operational information via the left steering angle detection sensor 191a for detecting an operational amount of the left maneuvering lever 115a and sends a control signal to the traveling inverter 171. The controller 100CU obtains a rotational speed of the right rear wheel 102b, i.e. a rotational speed of the right motor 182, based on operational information via the right steering angle detection sensor 191b for detecting an operational amount of the right maneuvering lever 115b and sends a control signal to the traveling inverter 171. As respective rotational speeds of the left motor 181 and the right motor 182 are varied independently based on the amounts of electric power supplied via the traveling inverter 171 to the let motor 181 and the right motor 182 independently, the rotational speeds of the left rear wheel 102a and the right rear wheel 102b can be made different from each other. By a resultant speed difference between the left and right rear wheels, a turning of the grass mower is effected.

Further Embodiments of Second Embodiment (1) In the foregoing embodiment, as the plate face of the mower deck 130 to which the soundproof sheet 104 is stuck, the top plate 131 of the mower deck 130 or the horizontal plate 411 of the belt cover 410 is used. Instead, the soundproof sheet 104 may be stuck to the front side plate 132 or the rear side plate 133 of the mower deck 130.

(2) In the foregoing embodiment, the soundproof sheet 104 is covered by the label sheet 140. Instead, the soundproof sheet 104 may be covered by any other than the label sheet 140, for instance, by a plain weatherable sheet. Further alternatively, a label printed on the surface of the soundproof sheet 104, namely, an integrated assembly of the soundproof sheet 104 and the label sheet 140 may be used also.

(3) In the foregoing embodiment, the soundproof sheet 104 is stuck to the front side face of the mower deck 130. Instead, it may be stuck to the back side face of the mower deck 130. Needless to say, the soundproof sheet 104 may be stuck to both the front side face and the back side face of the mower deck 130.

(4) In the foregoing embodiment, as a grass mower mounting the mower unit 103, a mid-mount riding electric powered grass mower was used. But, it may be other type of grass mower. For instance, it may be a grass mower which employs not an electric motor, but an internal combustion engine as the motor (engine) section. Further, the present invention is applicable also to a front mower mounting the mower unit 103 forwardly of the front wheel unit 101.

The invention claimed is:

1. A mower unit to be mounted to a grass mower comprising:
   a mower deck having a top wall and a side wall extending downwards from an edge of the top wall;
   a rotational shaft extending from an inner space formed by the top wall and the side wall and extending upwards through the top wall;
   a cutter blade attached to a lower portion of the rotational shaft within the inner space;
   a mower motor having a rotor and a coil which are disposed along an axial direction of an output shaft;
   a power transmission mechanism for transmitting power from the output shaft to the cutter blade;
   a mount deck having a horizontal mounting face for mounting the mower motor in such a manner that the output shaft assumes a vertical posture, the mount deck protruding outwards from the side wall; and
   a cooling arrangement incorporated in the mount deck for discharging heat of the mower motor,
   wherein the cooling arrangement comprises a heat discharging fin which is formed in a back side of the mounting face,
   wherein the mower motor is mounted to the mounting face via a heat discharging sheet or heat discharging grease, and
   wherein the mower motor is provided with a motor housing containing the rotor and the coil, the motor housing being separate from the heat discharging fin such that the heat discharging sheet or heat discharging grease is between the motor housing and the heat discharging fin.

2. The mower unit of claim 1, wherein the coil is disposed downwardly of the rotor in the axial direction of the output shaft and disposed in close vicinity of the mount deck.

3. The mower unit of claim 1, wherein the mount deck is disposed rearwardly of the side wall positioned at a rear portion of the mower deck; and the heat discharging fin extends along the flow of air introduced into the inner space in association with rotation of the cutter blade.

4. The mower unit of claim 1, wherein the mount deck is connected to the side wall in such a manner as to be able to transfer heat thereto.

\* \* \* \* \*